United States Patent [19]

Szymanski et al.

[11] Patent Number: 4,952,389

[45] Date of Patent: Aug. 28, 1990

[54] ALUMINA PARTICLES

[75] Inventors: Thomas Szymanski, Stow, Ohio; Kenneth R. Butcher, Hendersonville, N.C.; Donald J. Remus, Stow, Ohio

[73] Assignee: Norton Company, Worcester, Mass.

[21] Appl. No.: 407,845

[22] Filed: Sep. 15, 1989

[51] Int. Cl.$^5$ ............................................. C01F 7/02
[52] U.S. Cl. .................................. 423/625; 501/118; 501/127
[58] Field of Search ................. 423/625; 501/127, 118

[56] References Cited

U.S. PATENT DOCUMENTS

| 3,406,228 | 10/1988 | Hardy | 423/625 |
|---|---|---|---|
| 3,907,982 | 9/1975 | Leach | 423/625 |
| 3,975,231 | 8/1976 | Ziegenhain | 423/625 |
| 4,320,074 | 3/1982 | Birchall | 423/625 |

Primary Examiner—Peter D. Rosenberg
Attorney, Agent, or Firm—David Bennett

[57] ABSTRACT

Essentially spherical particles are disclosed of at least 98.5% alumina having a surface area less than about 1 m$^2$/g, an attrition resistance of less than about 0.3 weight percent/hour in an air jet attrition test, a particle size of about 30 to about 110 microns, a tap density of about 1.3 to about 1.9 g/cc, and sufficient porosity to hold catalytic metals in conventional catalytic amounts. The alumina particles are especially suited for use as fluid bed catalyst carriers for use in environments involving the presence of steam, particularly at high temperatures.

26 Claims, No Drawings

ALUMINA PARTICLES

TECHNICAL FIELD

This invention relates to friable particles having the following combination of properties: an alumina content of at least about 98.5%, a surface area of less than about 1 m$^2$/g, an attrition resistance as shown by a weight loss of less than about 0.30 weight % per hour, a particle size of about 30 to 110 microns, a tap density of less than about 1.9 g/cc, a generally spherical shape, and sufficient porosity to hold catalytic metals. The unique combination of properties makes these particles suitable for use as fluid bed catalyst carriers, especially for fluid bed reactors operated at temperatures of above about 800° C. in the presence of steam. This invention further relates to processes for producing particles having this combination of properties.

BACKGROUND AND INFORMATION DISCLOSURE STATEMENT

The following publications are representative of the most relevant prior art known to Applicants at the time of filing of this application:

| United States Patents | | |
|---|---|---|
| 4,572,439 | Feb. 25, 1986 | E. W. Pitzer |
| 4,756,746 | July 12, 1988 | P. B. Kemp et al. |
| Foreign Patents | | |
| JP 60/46963 | March 14, 1985 | Harima Refractories |

Alumina particles in general are well known. They have been used in many applications including as fluid bed catalyst support materials for a variety of chemical synthesis procedures, e.g. hydrogenation, dehydrogenation, dehydration, dehydrocyclization and the like. For example, the Kirk-Othmer Encyclopedia of Chemical Technology, Third Edition, Volume 10, pp 550-553, lists over 100 processes employing fluidized beds. Alumina particles may be produced having a wide variation in properties such as in alumina content, surface area, attrition resistance, particle size distribution, density, shape and porosity. Generally, the usefulness of particular alumina particles depends upon the type and severity of environment that they can withstand in use without degradation.

Particles or granules, including those of alumina, have been commercially prepared in generally spherical shapes by various processes including pelleting in liquid media during gravity flow down, gelling from alumina-containing dispersions, and plasma spraying; c.f. U.S. Pat. No. 4,756,746, Japanese Kokai No. 60/46,963. The difficulty is not in producing spherical alumina particles, but rather in producing essentially spherical alumina particles having the specific combination of properties which will enable the particles to be especially useful in steam-laden atmospheres at elevated temperatures.

Norton Company has sold commercially several low surface area fluidizable catalyst carriers, specifically types 06595 and 06596. These carriers, however, have air jet attrition rates of about 0.6-0.8 weight %/hr. As shown below, the carriers of the present invention offer substantially increased attrition resistance without increasing the silica content and also without adversely altering the bulk density and porosity. Increased attrition resistance is extremely important commercially since it reduces catalyst make up rates and therefore lowers unit operating costs.

The production of alumina particles having high attrition resistance can be relatively easily accomplished by merely separating the attrition resistant particles from a mixture of the same with frangible particles by using acoustic energy to disintegrate the frangible ones, c.f. U.S. Pat. No. 4,572,439. Alternatively and more generally, increased attrition resistance is accomplished by producing hardened particles which are more dense. The particles of the present invention, however, have a relatively low tap density of less than about 1.9 g/cc while simultaneously having an attrition resistance of less than about 0.30 weight percent/hour. It is also possible to manufacture more attrition resistant alumina particles by merely increasing their silica contents. This, however, makes the particles unsuitable for use in steam-laden environments due to the silica being leached from the particles and causing fouling of downstream equipment.

It is thus an object of the present invention to produce particles consisting essentially of alumina, which particles have a very low surface area, a high attrition resistance, a narrow particle size distribution, a relatively low density, a generally spherical shape, and also sufficient porosity to hold catalytic metals.

It is a further object to produce an essentially pure alumina particle which will have sufficient integrity to be used in fluid bed reactors operated under constant or varying exposure to steam such as in steam reforming or regeneration of hydrocarbon conversion catalysts and other such processes. It is particularly important for such operations to minimize the silica content of the particles due to the silica leaching problem.

SUMMARY OF THE INVENTION

It has now been discovered that alumina particles may be produced having a unique combination of properties which makes them particularly suited for use under extreme conditions of steam pressure and temperature. The particles of this invention consist of at least about 98.5 weight % alumina in a generally spherical shape and have (i) a surface area less than about 1 m$^2$/g (ii) an attrition resistance of less than about 0.30 weight percent per hour, (iii) a median particle size of about 30 to 110 microns, (iv) a tap density of less than about 1.9 g/cc, and (v) a porosity sufficient to hold catalytic quantities of catalytic metals.

These particles may be produced by (i) mixing −325 U.S. mesh high fired alpha alumina having an ultimate crystal size greater than about 25 microns, with one or more of (a) super ground alpha alumina having an average particle size less than about 5 microns and (b) a clay, with water, an organic binder, and a dispersant; (ii) spray drying the mixture to form generally spherical particles; (iii) heat treating the spray dried particles by heating for an extended period an elevated temperature, i.e. about 1400 to 1600° C., to produce friable solid alumina particle agglomerates; and (iv) deagglomerating the friable particles.

An alternative method of producing the particles is by (i) at least partially removing the water of hydration of hydrated alumina particles having a particle size about 5 to 50 % larger than desired in the final particles by heating to convert the hydrated alumina to gamma and/or alpha alumina and (ii) passing said particles through a plasma spray to spherodize them without causing agglomeration.

DESCRIPTION OF THE PREFERRED EMBODIMENTS

The particles of the present invention are predominantly, i.e. at least about 98.5 weight percent, alumina. Preferably they contain about 1.0 weight percent silica or less and about 0.1 weight percent or less iron and alkali metals. They have a very low surface area, i.e. below about 1, preferably below about 0.5, and most preferably below about 0.3 m$^2$/g. Moreover, the particles are highly attrition resistant, losing less than about 0.30, preferably less than about 0.20, and most preferably less than about 0.15 weight percent per hour when placed in an air jet attrition apparatus. Generally, the median particle size will range from about 30 to about 110 microns, preferably about 40 to 70 microns. The particles have a density of at least 1.3 g/cc but less than about 1.9, preferably less than about 1.8, and most preferably less than about 1.75 g/cc. The particles are generally spherical in shape. And the particles are sufficiently porous to be able to hold conventional catalytic metals in conventional amounts without increasing the amount of attrited material in an air jet attrition test by more than about 30, preferably more than about 25, and most preferably less than about 20, weight percent over the non-metal impregnated particles.

To produce alumina particles having this combination of high purity, low surface area, high attrition resistance, and moderate density, two basic procedures have been developed. The first starts with a mixture of materials which are formed into an aqueous slurry, the slurry spray dried to form generally spherical particles, and the spray dried particles then heat treated to provide the desired properties. Certain heat treatments inherently agglomerate the particles so that they must then be deagglomerated. Other heat treatments do not so agglomerate the particles and thus the heat treating and deagglomeration steps are effectively performed in a single operation.

It has been found that alumina particles having an attrition resistance below about 0.3 wt. % per hour may be prepared from the high fired/large crystal alpha alumina in combination with either the super ground alpha alumina or the clay or a combination of both. However, to prepare the preferred particles having an attrition resistance below about 0.2 wt %/hr, it has been found necessary to utilize both the super ground alumina and the clay, and in addition to perform the heat treatment at a sufficiently elevated temperature and for a sufficient period of time to reduce the attrition resistance of the particles to below 0.2 wt %/hr, but not so long as to cause fusion of the particles. The specific times and temperatures will vary depending upon the specific heat treating means and may be determined by routine experimentation, as is well known in the art.

An aqueous slurry is prepared containing a mixture of −325 U.S. mesh high fired alpha alumina having an ultimate crystal size greater than about 25 microns, such as a tabular alumina, in combination with one or more of (a) super ground alpha alumina having an average particle size less than 5 microns, preferably about 0.5 to 2 microns, or (b) a clay, along with an organic binder, and water. Optionally but preferably the slurry further contains one or more dispersants to lower the surface tension and make slurry formation easier. Generally the slurry will have about 15 to 45, preferably about 20 to about 40 weight percent solids, with the specific solids level being dependent upon the specific spray drying equipment being used to produce a particular particle size product.

Examples of high fired tabular alpha aluminas which may be used herein include tabular aluminas such as Alcoa T-64, Alcoa T-61, and LaRoche T-1061. These aluminas have surface areas of about 0.3 m$^2$/g, ultimate crystal sizes of about 50 to 300 microns and are readily available on the commercial market. Generally they will be present as about 85 to about 99 preferably about 88 to 98.5, and most preferably about 90 to about 95, weight percent of the solids content of the slurry.

The super ground alumina is an alpha alumina which has been processed to have an average particle size of less than about 5 microns, preferably about 0.5 to about 2 microns. Super ground aluminas are readily available from numerous sources. Generally, the super ground alumina will be used in an amount of about 2 to about 15, preferably about 4 to 12, and most preferably about 4 to about 8, weight percent of the solids content of the slurry. While the super ground alumina has been found to desirably increase the attrition resistance of the resultant alumina particles, it also has undesirably been found to increase the density and reduce the porosity. Thus, it should be used only in moderate amounts. Suitable examples of super ground aluminas include RC-172 DBM, RC-152 DBM, A-15 SG, and preferably A-16 SG.

The organic binder may be any conventional binder material known to be compatible with aluminas since it is used merely to provide green strength to the spray dried material and is then removed, i.e. burned out, during the subsequent heat treatment. Suitable such materials include polyvinyl alcohols (Vinol 205), ammonium salts of polymeric carboxylic acids (Tamol 901), polyvinyl acetates, dextrins, starches, and other organic binders well known to those skilled in the art.

The ceramic mixture also may contain a natural, synthetic, or purified clay, or a mixture thereof. Preferably the clay will be a montmorillonite or other smectite, a kaolin, an attapulgite, or a ball clay. Most preferably the clay will be a bentonite. Generally the clay will be used in an amount of up to about 4, preferably up to about 2, and most preferably about 0.8 to about 1.5, weight percent of the solids content of the slurry. Although as shown in Comparative Example A below, increasing the clay content of the particles will increase their attrition resistance, it also undesirably increases the silica content since clays generally contain 40 or more percent silica. Thus the maximum amount of a particular clay which may be used herein must be back-calculated based upon the specific silica content of both the clay and the desired alumina particles.

Dispersants which may be used herein include those surfactant compounds which will lower the interfacial tension between the alumina particles and the binder material. Examples of such dispersants include ammonium polyacrylates, quaternary ammonium A particularly suitable dipersant is Darvan C, an ammonium polymethacrylate. When used, they will be present in conventional amounts, i.e. up to about 3 percent of the total slurry weight. Most preferably the dispersant will not contain any sulfur, since sulfur can be undesirable for certain catalytic uses of the resultant alumina particles.

The slurry is produced by simply mixing the dry ingredients into the water optionally containing the dispersant, followed by stirring.

To form the essentially spherical particles, the slurry is then fed into a conventional spray drier operated so as to produce spherical particles and to remove most of the water, i.e. reduce the loss on ignition to less than about 1% weight percent. Generally to do so will entail the use of temperatures of about 100° to about 350° C., though the specific temperature has not been found critical, provided that the drier is operated to produce spherical particles in the desired 30 to 110 micron median particle size range. Exact operating conditions will vary with the particular spray drier and may be determined by routine experimentation.

The spray dried spherical alumina particles so produced have sufficient green strength to be fed to a kiln without disintegrating. They are then heat treated in a conventional manner to convert them into attrition resistant particles. The kiln used may be of any conventional type including static, rotary, fluid bed and tunnel kilns. The specific operating conditions of the kiln can be determined by routine testing, as is known in the art. Generally the heat treatment will be performed at a temperature above about 1300° and up to about 1600° C. Presently a tunnel kiln operated at a temperature of about 1450°-1540° C. and having a particle residence time of about 16 to 32 hours is preferred. Optionally, a suitable static, rotary or fluid bed kiln can be used.

The heat treatment described above hardens the particles but also causes them to become agglomerated. The agglomerates may then be deagglomerated by conventional means, i.e. hammer mills, pressure mills, vibrating screens and the like, to produce the generally spherical alumina particles having a very low surface area, a high attrition resistance, the desired particle size distribution, and the desired tap density and porosity.

Alternatively, the heat treatment and deagglomeration steps may be replaced by a single non-agglomerating heat treatment such as plasma spraying or microwave heating. In this case, the spray dried particles should generally be slightly, i.e. up to about 10%, larger in average particle size since the subsequent plasma or microwave treatments may slightly reduce the particle size of the resultant particles.

An alternative process for preparing the alumina particles of the present invention, but having essentially no silica at all, entails starting with a hydrated alumina having a particle size about 5 to 50 percent larger than desired in the final particles, heating those hydrated particles sufficiently to remove a substantial portion of the bound water and to convert the alumina to at least gamma alumina, and then subjecting the particles to plasma spraying.

The hydrated alumina starting material for this process may be any of the commercially available hydrates such as gibbsite, bayerite, and boehmite. The currently preferred material is gibbsite. The hydrated alumina of the appropriate particle size of time to convert it to predominantly at least gamma alumina. Generally this will entail heating it to at least about 600 C. Optionally, the heating may be at a higher temperature, e.g. at least about 1200° C., to convert at least a portion of the gamma alumina to the alpha phase. It has been found that by converting the hydrate to alpha alumina rather than only gamma produces final alumina particles having a reduced attrition resistance but a slightly increased tap density.

The hydrated alumina particles before drying and phase conversion should be about 5 to about 50, preferably about 10 to about 40, and most preferably about 15 to about 30, percent larger than the desired particle size of the final particles, since both the water removal and plasma operations have been found to reduce the particle size.

Although normally only completely dry materials are plasma processed (since the water would be expected either to unacceptably cool the plasma or to cause the particles to explode) it has been found unnecessary to totally remove all of the bound water during the heating step of this process. Up to about 3 weight percent bound water may remain in the plasma feed without deleteriously effecting the plasma operation. Preferably, the water content is only up to about 2 percent and most preferably it is only up to about 1 percent.

Plasma spraying is a well-known process which involves entraining a particulate material in a carrier gas and passing the mixture through a high temperature zone sufficient to at least partially melt the particulate material. The particles then are rapidly solidified into essentially spherical shapes having the specified combination of properties. In view of plasma spraying exposing the particles to extremely high temperatures for extremely short times, the particles do not agglomerate and thus no deagglomeration step is required after the plasma treatment.

The plasma has a high temperature zone, but in cross section the temperature can vary typically from about 5,500 to about 17,000° C. The outer edges are at a lower temperature and the inner part is at a higher temperature. The retention time of the particles in the plasma depends upon where the particles entrained in the carrier gas are injected into the nozzle of the plasma gun. Thus, if the particles are injected into the outer edge, the retention time must be longer, and if they are injected into the inner portion, the retention time is shorter. The residence time in the plasma flame can be controlled by choosing the point at which the particles are injected into the plasma. Residence time in the plasma is a function of the physical properties of the plasma gas and the feed particles themselves for a given set of plasma operating conditions and feed particles. After the material passes through the plasma and cools, it is rapidly solidified into the essentially spherical alumina particles having the combination of properties described.

The plasma spraying procedure may be performed in accordance with conventional technology. The specific operating conditions will vary depending upon the power, size, and other such properties of the specific torch used and they are best determined by routine experimentation. Generally, the torch will be a nitrogen torch having a power of at least about 10 KW, more preferably about 20 to 80 KW; the torch gas flow rate should be about 50 to 500, preferably about 75 to 200, standard cubic feet per hour; the nitrogen enthalpy should be about 10,000 to 30,000 BTU/lb; and the particle feed rate about 10 to 75 lb/hr. The carrier gas will preferably be nitrogen, but inert gases such as argon may also be used.

Currently preferred operating parameters for the plasma spraying step include: torch gas: nitrogen; torch gas flow rate: 100-150 SCFH; torch power: 60 KW; nitrogen enthalpy: 12,000-16,000 BTU/lb; and particle feed rate: 35-50 lbs/hr.

The alumina particles of this invention are particularly suited for use as fluid bed catalyst carriers since they have sufficient porosity to permit the conventional deposition of catalytic metals including both precious metals, such as platinum and palladium, and base metals, such as nickel and copper. The metals may be deposited in conventional manners and amounts. A further description thereof is readily available in the literature and one procedure is described in the impregnation example below.

The alumina particles are particularly suited for fluid bed reactors operated at conditions such that the particles are exposed to substantial amounts of steam at elevated temperatures as occurs in hydrocarbon conversion processes such as amoxidation, steam reforming, and partial oxidation for chemical manufacture, or in the regeneration of similar catalysts used under dry conditions. The particles are useful with steam at pressures greater than about 50 psia, preferably greater than about 100 psia, and at temperatures up to about 800° C., preferably up to about 1,000° C., and most preferably up to about 1200° C.

The alumina particles prepared by either of the processes have the unique combination of properties defined above. To determine the properties of particular alumina particles, the particles are evaluated in conventional well-known tests. Further details of the specific tests may be found in the detailed nonlimiting examples below in which all parts and percents are by weight unless otherwise specified.

EXAMPLE I 1.47 pounds of Vinol 205 polyvinyl alcohol binder is dissolved in 43.6 pounds of water to which 1.10 pounds of Darvan C ammonium polymethacrylate dispersing agent has been added. After mixing for 1 hours, 2.2 pounds of bentonite and 7.33 pounds of A-16 SG super ground alumina are then added and the resulting slurry mixed for 1.5 hours. 137 pounds of T-64 tabular alumina (−325 U.S. mesh and having an ultimate crystallite size of about 50 to 300 microns) are then added and the resulting slurry mixed for several additional hours.

The slurry prepared above is atomized through a pneumatic nozzle and into a drying chamber that is maintained at a temperature of 125° C. which is sufficient to evaporate the water and leave microspheroidal particles which are collected and fired in an electric furnace at a temperature of 1510° C. for five hours at peak temperature (after ramping from 200° to 540° C. at 40° C./-hour and from 540° to 1510° C. at 80° C./hour).

The fired agglomerates are broken up by mechanical means and the resulting microspheroidal particles have a typical log normal distribution of diameters.

The particle size distribution is determined using a sieving technique by which the individual particles are classified by size. Details of this technique are given in ASTM Method D-4513-85 (Standard Test Method for Particle Size Distribution of Catalytic Materials by Sieving). The weights and respective sieve opening sizes are then fit to a log normal probability function from which the median particle diameter is determined. Alternatively, the particle size could be measured by the laser light scattering technique detailed in ASTM Method D-4464-85 or the electronic counting technique described in ASTM Method D-4438-85.

Particle size and sphericity are confirmed via optical and scanning electron microscopy. The median particle diameter for this sample is 105 microns.

The attrition resistance of the particles is determined by placing a measured quantity of powder into a vertical attrition column where it is fluidized by three high velocity jets of air and subjected to attrition forces. The flow of air in the attrition vessel is maintained at an appropriate level so that the attrited material, i.e. particles smaller than approximately 20 microns, is entrained in the air stream and collected. The attrition rate is calculated by taking the ratio of the weight of fines collected and the attrition time. The attrition rate for this material is 0.15 weight percent per hour.

The tap density of the sample is determined using the technique specified in ASTM Method D-4512-85 (Standard Method for Vibrated Apparent Packing Density of Fine Catalyst Particles and Powder). The vibrated packing density for this sample is 1.72 g per cc.

The BET surface area of the sample is determined by measuring the volume of krypton gas absorbed by the carrier sample at 5 low pressure levels. Pressure differentials caused by gas absorption at the carrier surface are measured and used to calculate the BET surface area as outline in ASTM Method D-3663-84 (Standard Test Method for Surface Area of Catalysts). The surface area of this sample is 0.175 m$^2$/g.

EXAMPLE II

The preparation procedure of Example I is repeated with various compositions within the scope of this invention. The specific compositions and properties of the resultant particles are given in Table I below. Samples A–F are processed at a maximum heat treatment temperature of 1455° C.

TABLE I

Results of Example II
Compositions in Wt % and Properties Resulting

| Ingredient | A | B | C | D | E | F |
|---|---|---|---|---|---|---|
| Tabular Al2O3, T-64 | | | | 90.1 | 93.5 | 98.5 |
| Tabular Al2O3, T-61 | 93.5 | 93.5 | | | | |
| Tabular Al2O3, T-1061 | | | 93.5 | | | |
| Super Ground Al2O3, A-16 | | | 5.0 | 9.9 | 5.0 | |
| Super Ground Al2O3, RC 172 BM | 5.0 | 5.0 | | | | |
| Clay - Bentonite | | 1.5 | 1.5 | | 1.5 | 1.5 |
| Clay - Kaolin | 1.5 | | | | | |
| Properties Determined | | | | | | |
| Attrition Rate, Wt %/hr | 0.27 | 0.26 | 0.17 | 0.27 | 0.190 | 0.249 |
| Packing Density, g/cc | 1.34 | 1.32 | | | 1.44 | |
| Surface Area, m$^2$/g | 0.193 | 0.174 | | | 0.205 | |

EXAMPLE III

The procedure of Example I is repeated with a composition of T-64 tabular alumina, A-16 super ground alumina, and varying the amount of bentonite clay from 0 to 1.5%. The specific compositions and properties determined are given in Table II below. As is evident, the attrition rate decreases with increasing clay content. At 1.5% bentonite, the silica content of the particles is about 1.0 %. The surface areas of each sample are all below about 0.5 m$^2$/g.

TABLE II

| Results of Example III | | | | | |
|---|---|---|---|---|---|
| | G | H | I | J | K |
| Ingredients | | | | | |
| Tabular Al2O3, T-64 | 94.8 | 94.1 | 93.9 | 93.5 | 93.5 |
| Super Ground Al2O3, A-16 | 5.2 | 5.1 | 5.0 | 5.0 | 5.0 |
| Clay - Bentonite | | 0.8 | 1.1 | 1.5 | 1.5 |
| Property | | | | | |
| Attrition Resistance Wt %/hr | 0.285 | 0.196 | 0.143 | 0.164 | 0.118 |
| Packing Density, g/cc | | | | 1.53 | 1.73 |

COMPARATIVE EXAMPLE A

The procedure of Example I is repeated except that the tabular alumina with an ultimate crystal size of about 50 to 300 microns is replaced by conventional high fired aluminas having ultimate crystal sizes of 6-10 microns for the A-10 and 2-5 microns for the A-14. As can be seen in Table III, the attrition rates for the resultant particles are an order of magnitude greater than those of the present invention. The particles have a surface area below 1 $m^2/g$.

TABLE III

| Results of Comparative Example A | | |
|---|---|---|
| | L | M |
| Ingredients | | |
| A-10 | 93.5 | — |
| A-14 | — | 93.5 |
| Bentonite | 1.5 | 1.5 |
| Super Ground Al2O3 | 5.0 | 5.0 |
| Property Determined | | |
| Attrition Resistance, Wt. % Loss/hr | 1.98 | 1.35 |
| Packing Density g/cc | 1.34 | 1.34 |

EXAMPLE IV

Gibbsite particles (A-245 of Custom Grinders) ground to an average particle size of 50-70 microns are heated to 1288° C. for 5 hours to convert the gibbsite to substantially alpha alumina and to reduce the water content to less than 2%. This material is then passed at a rate of 40 pounds per hour through six 1/16 inch diameter holes placed circumferentially at the bottom of the anode of a plasma torch. The holes are 60. apart and normal to the torch axis. Under these conditions with a 60 KW nitrogen torch having a nitrogen enthalpy of 12,000-16,000 BTU/lb, a total carrier gas flow of 70 to 80 standard cubic feet of nitrogen per hour is adequate to inject the dehydrated gibbsite particles into a sufficiently high temperature zone of the plasma. The treated material is recovered both by gravity collection in a pan and cyclone collection.

The plasma spheroidized alumina particles recovered at the pan had a mean particle size of 68 microns, a packing or tap density of below 1.9 g/cc, a surface area below 0.5 $m^2/g$, an attrition loss of 0.28 wt % per hour, and sufficient porosity to hold catalytic metals. The alumina particles recovered in the cyclone were slightly smaller, i.e. 48 micron median size, and slightly less attrition resistant, i.e. 0.31 wt % per hour weight loss.

EXAMPLE V

The basic procedure of Example IV was repeated with a different gibbsite, i.e. C-31 of Alcoa. Two samples of the gibbsite were partially dehydrated, one at 600° C. for 5 hours to convert it to substantially gamma and one at 1288° C. for 5 hours to convert it to substantially alpha.

The resultant plasma spheroidized particles had surface areas below $m^2/g$, sufficient porosity to hold catalytic metals, and the properties as shown in Table IV below.

TABLE IV

| Results of Example V | | | |
|---|---|---|---|
| Precursor | Median Particle Size, Microns | Tap Density g/cc | Attrition % loss/hr |
| gamma - p | 44 | 1.63 | 0.154 |
| gamma - c | 36 | 1.74 | 0.3 |
| alpha - p | 44 | 1.72 | 0.102 |
| alpha - c | 34 | 1.81 | 0.180 | p = product collected at pan
c = product collected at cyclone

COMPARATIVE EXAMPLE B

The procedure of Example IV is repeated but starting with completely densified alpha aluminas having essentially no void volume. In one case, 57 Alundum (−150 U.S. mesh) from Norton Company is used and in the other 38 Alundum (−120 U.S. mesh) is used.

In each case, highly attrition resistant particles showing attrition losses of less than 0.1 wt % per hour are produced. While the particles meet some of the requirements of this invention, the particles have essentially no porosity and also have packing densities greater than 1.9 g/cc.

COMPARATIVE EXAMPLE C

The alpha-fired gibbsite of Example V was processed by the heating procedure of Example 1, i.e. static firing, but to a maximum temperature of 1593° C. in an attempt to increase its attrition resistance. The resultant material exhibits a median particle size of only 24 microns, a packing density of 1.09 g/cc, and an attrition loss of 1.97 wt % per hour.

The use of a static heating process with a dehydrated aluminum hydrate produces alumina particles which are not at all similar to those of the present invention.

EXAMPLE VI

To demonstrate the ability of the alumina particles of the present invention to hold catalytic metals without substantially increasing the attrition loss therefrom, the procedure of Example I is repeated with a larger quantity of that composition at two different heat treating temperatures, one sample at 1490° C. and the second at 1540° C. Samples of each material are impregnated by the incipient wetness technique with a sufficient quantity of 28 percent aqueous nickel nitrate solution to give 1.06 and 1.3 weight percent nickel catalyst after calcination.

Both impregnated and non-impregnated samples are evaluated in an air jet attrition apparatus to determine the attrition loss. The results are:

| Sample | Wt %/hr |
|---|---|
| 1490° C. - no Ni | 0.191 |
| 1490° C. - Ni | 0.213 |
| 1540° C. - no Ni | 0.133 |
| 1540° C. - Ni | 0.169 |

A comparison of the 1540° C. samples shows that the metal impregnation increases the attrition by 27% and a comparison of the 1490° C. samples show an increase of only 11.5%.

Thus the alumina particles of this invention have sufficient porosity to hold catalytic quantities of catalytic metals.

What is claimed is:

1. Friable particles having an alumina content of at least about 98.5 weight percent, a surface area of less than about 1 m²/g, an attrition resistance of less than about 0.3 weight % per hour when tested in an air jet apparatus, a particle size ranging from about 30 to about 110 microns, a tap density of about 1.3 to about 1.9 g/cc, a generally spherical shape, and sufficient porosity to hold catalytic quantities of catalytic metals.

2. The particles of claim 1, wherein they contain about 1.0 weight percent or less of silica and about 0.1 weight percent or less each of iron and alkali metals.

3. The particles of claim 1, wherein the surface area is less than about 0.3 m²/g.

4. The particles of claim 1, wherein the particles have an attrition resistance of less than about 0.2 weight %/hr.

5. The particles of claim 1, wherein the particles have an attrition resistance of less than about 0.15 weight %/hr.

6. The particles of claim 1 having an average particle size of about 40 to about 70 microns.

7. The particles of claim 1, wherein the tap density is less than about 1.8 g/cc.

8. The particles of claim 1, wherein the tap density is less than about 1.75 g/cc.

9. The particles of claim 1, wherein they have sufficient porosity to hold catalytic metals without increasing the amount of attrited material in an air jet attrition test by more than about 30 percent as compared to non-metal coated particles.

10. The particles of claim 1, wherein they have sufficient porosity to hold catalytic metals without increasing the amount of attrited material in an air jet attrition test by more than about 20 percent as compared to non-metal coated particles.

11. A process for preparing friable particles having an alumina content of at least about 98.5 weight percent, a surface area of less than about 1 m²/g, an attrition resistance of less than about 0.3 weight percent per hour when tested in an air jet apparatus, a particle size ranging from about 30 to about 110 microns, a tap density of about 1.3 to about 1.9 g/cc, a generally spherical shape, and sufficient porosity to hold catalytic quantities of catalytic metals, said process comprising the steps of (i) forming an aqueous slurry having about 15 to about 50 weight percent solids wherein the solids comprise about 85 to about 99 weight percent −325 U.S. mesh of a high fired alumina having an ultimate crystallite size of greater than about 25 microns, and about 1 to about 15 weight percent of a material selected from the group consisting of (a) a super ground alpha alumina having a particle size less than about 5 microns, (b) a clay, and (c) a mixture of (a) and (b); (ii) spray drying the slurry to produce substantially spherical particles having an average particle size of about 30 to about 110 micron; (iii) heat treating the spray dried particles at a temperature below their melting points to form agglomerates of alumina particles having a surface area below about 1 m²/g and an attrition resistance of less than about 0.3 weight %/hour in an air jet apparatus; and (iv) deagglomerating the agglomerates to produce the particles.

12. The process of claim 11, wherein the high fired alumina is a tabular alumina 13. The process of claim 11, wherein the alpha alumina has a particle size of less than about 3 microns.

14. The process of claim 11, wherein the clay is a montmorillonite.

15. The process of claim 14, wherein the clay is bentonite and it is used in an amount up to about 2 weight percent of the solids of the aqueous slurry.

16. The process of claim 11, wherein the spray dried particles have an average particle size of about 40 to about 70 microns.

17. The process of claim 11, wherein the heat treating is performed at a temperature of up to about 1540° C.

18. The process of claim 11, wherein the aqueous slurry further contains a dispersant.

19. The process of claim 18, wherein the dispersant is an ammonium polymethacrylate.

20. The process of claim 11, wherein the spray drying is performed at a temperature of about 100° to about 350° C.

21. A process for producing friable particles having an alumina content of at least about 99.5 weight percent, a surface area of less than about 1 m²/g, an attrition resistance of less than about 0.3 weight percent per hour when tested in an air jet apparatus, a particle size ranging from about 30 to about 110 microns, a tap density of about 1.3 to about 1.9 g/cc, a generally spherical shape, and sufficient porosity to hold catalytic quantities of catalytic metals, said process comprising (i) heating hydrated alumina particles having a particle size of about 35 to about 150 microns to remove at least about 90 weight percent of the bound water and to convert the hydrate to at least gamma alumina and (ii) entraining the particles in a carrier gas and passing them through a high temperature zone of a plasma spray at a temperature sufficient to at least partially melt the particles and to cause them to have the properties.

22. The process of claim 21, wherein the hydrated alumina is gibbsite.

23. The process of claim 21, wherein the heating is at a temperature of at least about 600° C.

24. The process of claim 21, wherein the heating converts at least a portion of the hydrate to alpha alumina and the heating is at a temperature of at least about 1100° C.

25. The process of claim 21, wherein the plasma spray is performed formed with a nitrogen torch gas at a torch gas flow of about 50 to 500 SCFH; torch power of at least 10 KW; nitrogen enthalpy of about 10,000 to about 30,000 BTU/lb; and a particle feed rate of about 10 to about 75 lb/hr.

26. The process of claim 21, wherein the plasma spray is performed under the following conditions: nitrogen torch gas; torch gas flow of about 100 to 150 SCFH; torch power of 60 KW; nitrogen enthalpy of about 12,000 to about 16,000 BTU/lb; and a particle feed rate of about 30 to about 50 lb/hr.

* * * * *

UNITED STATES PATENT AND TRADEMARK OFFICE
CERTIFICATE OF CORRECTION

PATENT NO. : 4,952,389                        Page 1 of 2

DATED     : August 28, 1990

INVENTOR(S) : Thomas Szymanski, Kenneth R. Butcher and Donald J. Remus

It is certified that error appears in the above-indentified patent and that said Letters Patent is hereby corrected as shown below:

Column 4, line 61 of the printed patent:

After "Ammonium" insert ---carboxylates, acetylenic diols, and ethoxylated nonyl phenols.---

Column 5, Line 8 of the printed patent:

After "about" delete 1% and insert ---10%---

Column 5, Line 59 of the printed patent:

After "size" insert ---is then held at an elevated temperature for a sufficient period---

Column 5, Line 61 of the printed patent:

After "600" insert ---°---

Column 9, Line 46 of the printed patent:

After "60" insert ---°---

UNITED STATES PATENT AND TRADEMARK OFFICE
CERTIFICATE OF CORRECTION

PATENT NO. : 4,952,389

DATED : August 28, 1990

INVENTOR(S) : Thomas Szymanski, Kenneth R. Butcher and Donald J. Remus

It is certified that error appears in the above-indentified patent and that said Letters Patent is hereby corrected as shown below:

Column 10, line 4 of the printed patent:

After "below" insert ---1---

Signed and Sealed this

Twenty-fifth Day of January, 1994

Attest:

BRUCE LEHMAN

Attesting Officer

Commissioner of Patents and Trademarks